(12) United States Patent
Göcke et al.

(10) Patent No.: US 10,556,806 B2
(45) Date of Patent: Feb. 11, 2020

(54) TWO-STAGE CALCINATION METHOD, AND PLANT FOR SAME

(71) Applicant: Claudius Peters Projects GmbH, Buxtehude (DE)

(72) Inventors: Volker Göcke, Karkerbeck (DE); Matthias Raabe, Buxtehude (DE)

(73) Assignee: Claudius Peters Projects GmbH, Buxtehude (DE)

( * ) Notice: Subject to any disclaimer, the term of this patent is extended or adjusted under 35 U.S.C. 154(b) by 0 days.

(21) Appl. No.: 16/325,640

(22) PCT Filed: Aug. 11, 2017

(86) PCT No.: PCT/EP2017/070484
§ 371 (c)(1),
(2) Date: Feb. 14, 2019

(87) PCT Pub. No.: WO2018/033491
PCT Pub. Date: Feb. 22, 2018

(65) Prior Publication Data
US 2019/0202709 A1      Jul. 4, 2019

(30) Foreign Application Priority Data
Aug. 17, 2016   (EP) ..................... 16184511

(51) Int. Cl.
*C01F 11/46* (2006.01)
*B01J 6/00* (2006.01)

(52) U.S. Cl.
CPC ............. *C01F 11/466* (2013.01); *B01J 6/001* (2013.01); *B01J 6/004* (2013.01); *C01P 2006/82* (2013.01)

(58) Field of Classification Search
CPC ........ C01F 11/46; C01F 11/466; C04B 11/02; C04B 11/028; B01J 6/001; B01J 6/004; C01P 2006/82
See application file for complete search history.

(56) References Cited

U.S. PATENT DOCUMENTS

2008/0069762 A1   3/2008  Lynn et al.
2011/0168061 A1   7/2011  Goecke et al.

FOREIGN PATENT DOCUMENTS

RU    2375324 C2 *  12/2009   .......... B01F 11/0082
WO    2009/135688      5/2009

OTHER PUBLICATIONS

International Preliminary Report on Patentability dated Feb. 19, 2019, directed to International Application No. PCT/EP2017/070484; 7 pages.

(Continued)

*Primary Examiner* — Timothy C Vanoy
(74) *Attorney, Agent, or Firm* — Morrison & Foerster LLP

(57) ABSTRACT

A method for the calcination of powdery or fine-particled plaster, comprising two steps: the plaster is subjected to a flash-calcination in a calcinator and the hot plaster is post-calcinated in a reaction vessel. Post-calcination is carried out in the reaction vessel by adding humid gas, said reaction vessel not being heated. The postcalcination takes place over a long period of time, that is at least 10 times, preferably 50-100 times longer than the amount of time taken for flash calcination. Calcination takes place without expending additional energy, and the remaining dihydrate produced during the flash calcination is also transformed into semi-hydrate and undesired anhydrite fractions are reduced. The method can ensure consistency in the product quality and also increase product quality. The temperature in the upstream (Continued)

calcinator can be lowered thus saving more energy. The method can also be used to accelerate the ageing of calcinated plaster.

28 Claims, 2 Drawing Sheets

(56) References Cited

OTHER PUBLICATIONS

International Search Report and Written Opinion dated Oct. 12, 2017, directed to International Application No. PCT/EP2017/070484; 20 pages.

* cited by examiner

TWO-STAGE CALCINATION METHOD, AND PLANT FOR SAME

CROSS-REFERENCE TO RELATED APPLICATIONS

This application is a national stage application under 35 USC 371 of International Application No. PCT/EP2017/070484, filed Aug. 11, 2017, which claims the priority of European Patent Application No. 16184511.0, filed Aug. 17, 2016, the entire contents of each of which are incorporated herein by reference.

FIELD OF THE INVENTION

The invention relates to a method for calcining gypsum, comprising a first stage, with flash calcination, and a second stage, for post-calcination in a reaction vessel, wherein the gypsum is guided via a transfer line from the first stage to the second stage.

BACKGROUND OF THE INVENTION

For producing gypsum, various calcining methods are known. During the calcining, wet gypsum (natural gypsum and/or gypsum from flue gas desulfurization installations) is converted by extracting water of crystallization. In chemical terms, this means the conversion of dihydrate ($CaSO_4 * 2H_2O$) to hemihydrate ($CaSO_4 * \frac{1}{2}H_2O$) by means of heat. In this case, the alpha or beta modification of the hemihydrate can be formed here depending on water vapor partial pressure. Also, depending on temperature level, a so-called anhydrite modification can additionally be formed. In order to achieve high quality in the case of the calcined gypsum, the temperature profile and the dewatering profile are to be controlled carefully. There must be no overheating, and furthermore, as far as possible, also no inhomogeneities with respect to action of water vapor or temperature should occur. Otherwise, undesired phase conversions can result locally, which would entail a reduction in quality. Direct or indirect methods, in particular, have practical significance for the production of the hemihydrate. In this case, "direct" is understood to mean that the hot gas used for the calcining is in direct contact with the dihydrate. By contrast, "indirect" is understood to mean the use of a heat exchanger for the calcining.

A method for calcining by means of a two-stage process is known from WO 2009/135688 A1. The first stage involves so-called flash calcination, by way of which calcination to the desired residual water of crystallization value of the end product is performed within a very short time (of only a few seconds). Provided in a downstream second stage is a post-reactor, which completes the calcination. Here, the post-reactor has no dedicated heating, but is of thermally passive design and merely has a supply of (hot) wet gas. This method leads to gypsum of fairly high quality, but has the disadvantage that the supply of hot, wet gas can be fairly cumbersome. On the one hand, a relatively large amount of energy is required for this purpose, and, on the other hand, the method requires high regulation quality in order to produce the desired high quality.

SUMMARY OF THE INVENTION

It is the object of the invention to provide an improved method, and to provide a corresponding installation, which are less cumbersome.

Provided according to some embodiments of the invention in a method for calcining gypsum, comprising a first stage, with flash calcination, and a second stage, for calcination to completion in a reaction vessel, wherein the gypsum is guided via a transfer line from the first stage to the second stage, is indirect heating in the second stage, wherein, in the second stage, water vapor is recirculated without external vapor and/or water being supplied. Preferably, the calcination in the second stage is carried out as slow calcination.

An aspect of embodiments of the invention is the concept of combining a combination of the flash calcination in the first stage with an indirect complete calcination in the second stage. The indirect heating allows largely closed process control, which, according to the invention, is realized by recirculation of the water vapor in the reaction vessel of the second stage. Due to the recirculation, a supply of additional vapor to the second stage, as required in the cited prior art, is rendered superfluous. According to some embodiments, said supply is indeed to be avoided. This is because the recirculation results in a circuit which is closed in this respect and which has significantly more favorable regulation behavior.

Flash calcination is realized at temperatures significantly above the calcining temperature of 90° C., in particular at temperatures of greater than 130° C. The dwell time lies in the range of seconds, in particular between 1 and 30 seconds. A positive pressure is generally not provided.

"Slow calcination" is understood to mean a calcination which lasts at least one order of magnitude longer than a flash calcination, preferably at least forty times longer. In particular, dwell durations of 6 to 40 minutes, preferably 10 to 25 minutes, have proven to be successful. This may take place under ambient pressure conditions, optionally however under positive-pressure conditions, in particular between 2 and 4.5 bar positive pressure, preferably at 2.5 to 3.5 bar positive pressure. The temperature is slightly above the calcining temperature, in particular at most 160° C.

Aspects of embodiments of the invention are based on the realization that, by way of the expelled water of crystallization from the second stage, an autonomous water vapor supplier is available, which, by way of the recirculation, may be used fully for supplying the second stage with the required water vapor. This allows a large water vapor fraction to be maintained in the second calcining stage, without separate vapor generation being required. Consequently, only little or no anhydrite is formed. Thanks to the invention, external vapor generation or supply of otherwise available water vapor to the second stage is no longer necessary. This means low complexity of the process control, which can result in a reduction in the energy outlay. The invention, according to some embodiments, thus combines low complexity and outlay and high quality.

For the method according to some embodiments of the invention, the setting of an excessively high content of water of crystallization in the transfer line has proven to be particularly successful. "Excessively high" is understood to mean a content of water of crystallization which is higher than the target content of water of crystallization of the subsequent, second stage. Consequently, upon the transition from the first stage to the second stage, the content of water of crystallization is set too high in a systematic manner. This appears to be paradoxical since a reduction of the water of crystallization should indeed be achieved inherently by way of the calcination. However, the invention, according to some embodiments, has recognized that, by way of this setting of an excessively high content of water of crystallization, it is possible to significantly improve the calcining result of the second stage through the use of the recirculation according to the invention.

The recirculation is expediently realized in a variable manner. "Variable" is understood to mean that the recirculation is carried out with differing degree of recirculation. If the degree of recirculation is reduced, an ever increasing fraction of the waste air is guided away from the reaction vessel and no longer recirculated. This expediently occurs through removal of waste gas for the purpose of adaptation of the water content in the second stage. The heating is, if appropriate, correspondingly corrected, with the result that the heat loss due to a relatively low degree of recirculation is compensated for, and vice versa.

Advantageously, the recirculated water vapor is returned via a fluidization device into the reaction vessel. The return via the fluidization device gives rise to a particularly expedient mixing of the recirculated water vapor with the material to be calcined. This ensures uniform action of water vapor, with the result that local inhomogeneities cannot occur. Consequently, it has a very favorable effect on the maintenance of high quality.

The recirculation expediently involves a regulable blower. Consequently, it is possible for the degree of recirculation to be set in a simple and advantageous manner by way of changed actuation of the blower. This makes possible a procedure which is robust and simple to regulate. It is particularly preferred if the regulation of the blower serves for setting a desired degree of recirculation and/or value for a target water vapor fraction.

The calcination in the second stage preferably takes place at a temperature of less than 160° C. Preferably, the temperature is between 120° C. and 150° C. With this temperature range, complete calcination is ensured on the one hand, but, by avoidance of excessive temperature, the risk of undesirable formation of anhydrite is decisively reduced on the other hand.

Advantageously, the content of water of crystallization in the transfer line is set to a value of 8% to 20%, preferably of 10% to 16%. This setting ensures that sufficient water vapor is available for the recirculation and the second calcining stage can thus function in a satisfactory manner. Secondly, the foundation for favorable regulation in the second stage is thus laid since, in this way, said regulation exclusively has to ensure a reduction in the content of water of crystallization. Variations can thus be compensated better.

The target content of water of crystallization is expediently set to a value of 5% to 7%, preferably between 5.5% and 6.5%. Consequently, high-quality hemihydrate is provided, which, with the further processing of the product, has a low water requirement.

The invention, according to some embodiments, also extends to a calcining installation for calcining gypsum, comprising as a first stage a calciner, which is designed for flash calcination, and as a second stage a reaction vessel, which is arranged therebehind in the direction of process flow and which is designed for calcination to completion, wherein the gypsum is guided via a transfer line from the first stage to the second stage and is removed from the second stage via a discharge device, and, according to the invention, the reaction vessel is provided with an indirect heating means and is designed in an autonomous manner in terms of vapor with a recirculation device for water vapor.

Also, the invention, according to some embodiments, extends to a retrofit reactor which is arranged downstream of a flash calciner by means of a transfer line, as described above. The retrofit reactor has a discharge device for the calcined gypsum and a preferably separate waste-air line for water vapor. Furthermore, the retrofit reactor has a dedicated recirculation device, by means of which the water vapor thus drawn off is recirculated. The fact that said water vapor is directly introduced back into the retrofit reactor means that it can directly contribute to the continuation of the reaction proceeding in the retrofit reactor. The recirculation device expediently has a blower for returning the water vapor.

BRIEF DESCRIPTION OF THE DRAWINGS

The invention will be explained in more detail below with reference to the appended drawing on the basis of an exemplary embodiment. In the figures.

DETAILED DESCRIPTION OF THE INVENTION

Figure 1:
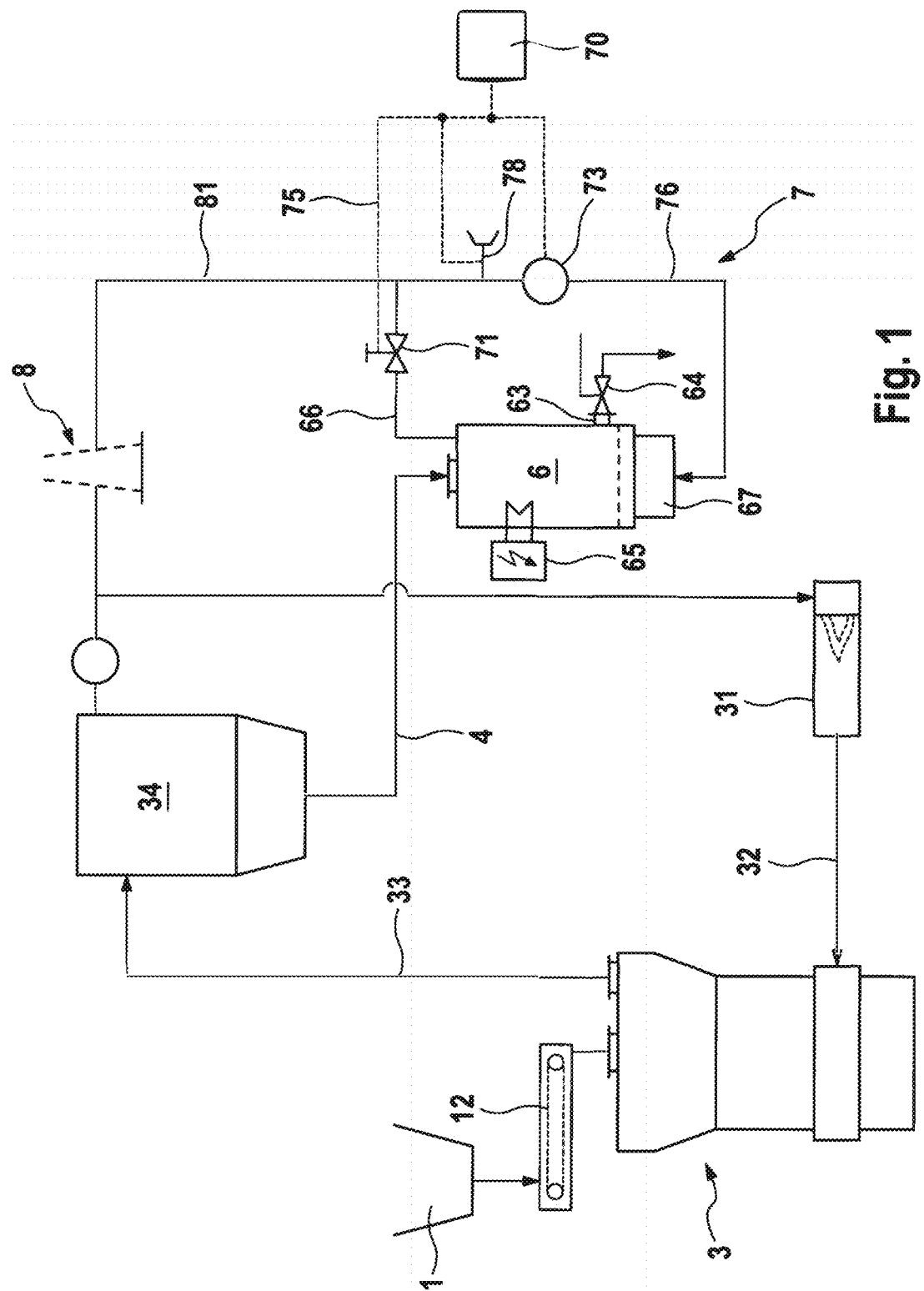
FIG. 1 shows a schematic overview illustration of an exemplary embodiment.

An exemplary embodiment for an installation for calcining gypsum is explained in FIG. 1.

Raw material for the gypsum to be calcined is introduced into the calcining installation at a feed point 1. The raw material may be raw gypsum, or recycled gypsum products such as gypsum construction boards, and also FGD gypsum from flue gas desulfurization installations (FGD). The application area of the invention is not restricted only to such gypsum, but rather also extends to other types of synthetic gypsum.

From the feed point 1, the gypsum raw material passes via a conveyor path 12 into a flash calciner, the latter being designed in the form of a calcining mill 3 in the illustrated exemplary embodiment. There, the gypsum is comminuted and calcined. The calcination is realized as flash calcination. This means there is a short dwell time of less than 30 seconds at an exit temperature of 150° C. to 160° C., that is to say above the actual calcining temperature. For this purpose, a hot-gas generator 31 is connected to the calcining mill 3 via a supply line 32, whereby the hot gas is supplied at a temperature of approximately 620° C.

After flash calcination has been realized (which according to the invention need not be complete) for a dwell duration of, for example, only 20 seconds, the gypsum, still hot at over 150° C., is guided via a rising line 33 from the calcining mill 3 to a filter installation 34. From there, a transfer line 4 leads to a reaction vessel 6 according to the invention. It remains there for 20 minutes and is calcined to completion during this time. This is realized solely through the use of the moisture of the supplied gypsum following the flash calcination, without additional water vapor being supplied externally. The functioning of the reaction vessel 6 will be described in more detail later. From the reaction vessel 6, the still hot gypsum is discharged via a discharge device 63, which comprises a pressure lock 64, for subsequent cooling (not illustrated). For the discharge of waste air, an installation for system waste air 8 is provided. The calcining mill 3, the filter 34 and the reaction vessel 6 are connected to said installation.

A recirculation installation 7 is furthermore provided. From a waste-air line 66 arranged at the top of the reaction vessel, waste air is drawn off from the reaction vessel 6 and returned via a pressure regulation valve 71 and a recirculation line 76 with a blower 73 in order to be blown back into the reaction vessel 6 via a fluidization device 67 arranged at the bottom thereof. The latter comprises fluidization nozzles 68 and a fluidization bottom 66 in the lower region of the reaction vessel 6. For the heating of the reaction vessel 6, a heat exchanger 65, via which indirect heating is performed, is provided. Due to the indirect heating, this is realized in a "dry" manner, that is to say without the supply of moisture. The calcination within the reaction vessel 6 is realized solely through the use of the indirect heat supply and the moisture of the gypsum introduced, this being repeatedly provided for the process by means of the recirculation installation 7.

A control device 70 is provided for the regulation of the recirculation. It acts, by way of its output signal line 75, on the pressure regulation valve 71 and the blower 73. The pressure regulation valve 71 regulates the pressure in the reaction vessel 6 and is connected via a T-piece to the recirculation line 76 and to a waste-gas line 81 which leads to a waste-air chimney 8. By means of the control device 70, it is possible by adjustment of the blower 73 (setting of the blower power) for the recirculation quantity and thus the degree of recirculation of the recirculation installation 7 to be varied. Additionally arranged in the recirculation line 76 is an external-air flap 78, in order even in the case of low degrees of recirculation to obtain a sufficient quantity of fluidization gas through the supply of external air.

Figure 2:
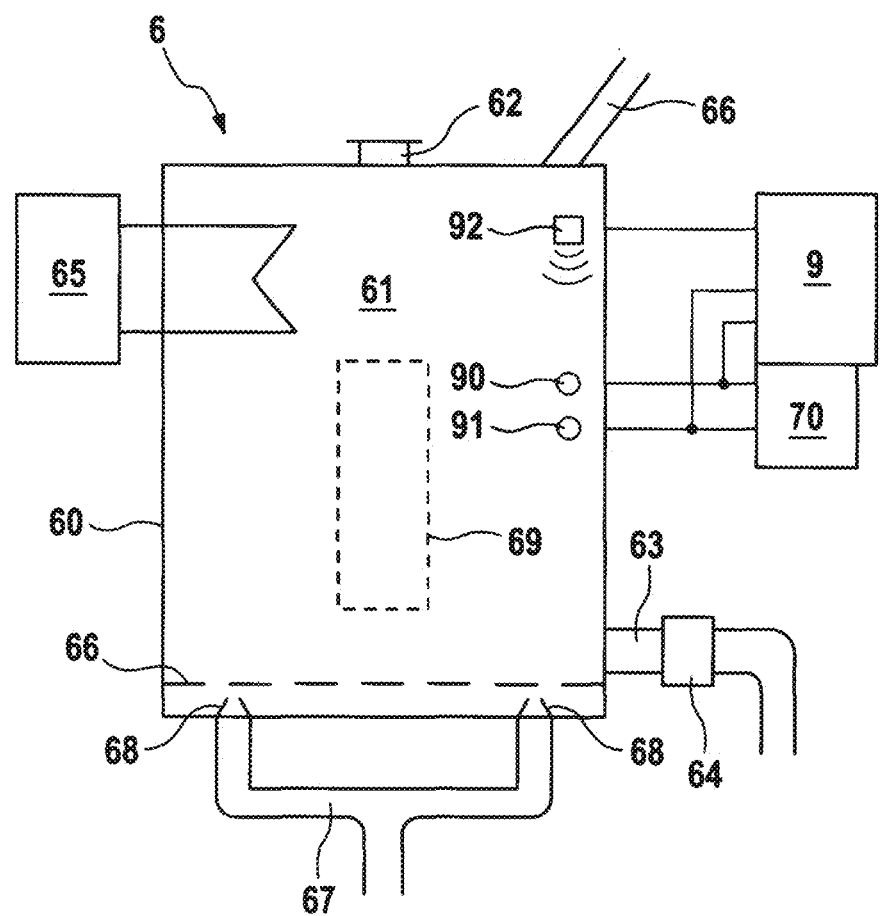
FIG. 2 shows a sectional view of a reaction vessel of the calcining installation as per FIG. 1.

An exemplary embodiment for the reaction vessel 6 is illustrated in more detail in FIG. 2. The reaction vessel 6 comprises as main components a housing 60, which encloses a working chamber 61, and a supply device 62, which is arranged at the upper end and into which the transfer line 4 is connected, and the discharge device 63, which is arranged in the lower region and which transports away the then completely calcined gypsum. In the illustrated exemplary embodiment, the housing 60 is of cylindrical shape, with the supply device 62 being arranged in an upper end wall and the discharge device 63 being arranged close to the bottom. A fluidization bottom 66 is arranged in a horizontal direction in the interior of the likewise cylindrical working chamber 61. The fluidization bottom 66 substantially comprises a bottom with hollow chambers, arranged thereunder, for supplying fluidization gas, which can emerge upwardly through openings in the fluidization bottom 66, and in the process flows through and fluidizes a layer, resting on the fluidization bottom 66, of the material to be treated. The fluidization gas is blown in via fluidization nozzles of the fluidization installation 67, which are arranged at the lower end of the reaction vessel 6.

A rising pipe 69 extending from the bottom upward is provided below the supply device 62 in the axis of the cylindrical working chamber 61. Said pipe has a metallic pipe jacket, which has a free cross section which is approximately one fifth of the length of the rising pipe. The gas mixture flowing in the rising pipe 69 entrains particles of the material to be treated from the surroundings, whereby the entrained particles of the material are conveyed back into the upper region of the working chamber 61. A circulating movement is thereby formed, by way of which, through the use of the moisture of the gas mixture and the indirect heating via the heat exchanger 65 of the material entering via the supply device 62, effective post-calcination can be achieved.

The control device 70 is linked to a control system 9, which is further designed to control the temperature and the dwell time in the reaction vessel 6. Arranged on the reaction vessel 6 are sensors, a temperature sensor 90, a moisture sensor 91 and a fill level sensor 92, which are connected to the control system 9. The control system 9 combines the measured values and acts on the heating by means of the heat exchanger 65 and the pressure lock 64 of the discharge device for the purpose of regulating temperature and dwell time. The control device 70 furthermore regulates the pressure in the reaction vessel 6 via the pressure regulation valve 71. For increasing moisture, the degree of recirculation is increased, and for reducing moisture, the degree of recirculation is reduced and, if appropriate, ambient air supplied. An increase in the degree of recirculation results in better maintenance of temperature in the reaction vessel 6 since fewer losses due to waste air arise.

The gypsum calcined only partially by the calcining mill 3 is calcined to completion, that is to say the conversion from dihydrate to hemihydrate is completed, and any anhydrite (AIII) present becomes hemihydrate.

This achieves the effect that the gypsum coming from the calcining mill 3 is calcined to completion in a controlled manner through the use of its own moisture. Thanks to the recirculation installation 7 and the heat exchanger 65, it is thus possible to set the desired target content of water of crystallization and the desired quality for the calcined gypsum.

This allows a more uniform and improved quality of the calcined gypsum to be achieved. Firstly, greater uniformity is obtained by compensating for brief variations thanks to the buffering achieved by way of the time spent in the working chamber 61. Furthermore, a reduction of undesired soluble anhydrite fractions and of dihydrate fractions is obtained. A further considerable advantage is in the possible regulation of the water and gypsum value, setting time and residual water of crystallization through the control of the degree of recirculation and the dwell time in the working chamber 61.

The invention claimed is:

1. A method for calcining gypsum, comprising:
    calcining the gypsum in a first stage with flash calcination,
    guiding the gypsum from the first stage to a second stage via a transfer line, and
    calcining the gypsum to completion in a reaction vessel in a second stage using indirect heating wherein, in the second stage, water vapor is recirculated without external vapor or water being supplied.

2. The method of claim 1, comprising setting an excessively high content of water of crystallization in the transfer line that is greater than a target content of water of crystallization of the second stage.

3. The method of claim 1, wherein recirculation of water vapor comprises variable recirculation with differing degrees of recirculation.

4. The method of claim 3, wherein the variable recirculation is regulated based on a desired target content of water of crystallization of the gypsum.

5. The method of claim 4, wherein the degree of recirculation is modified through removal of waste gas for modifying the water vapor content in the second stage.

6. The method of claim 1, wherein recirculated water vapor is returned via a fluidization device into the reaction vessel for the second stage.

7. The method of claim 6, wherein the reaction vessel is acted on by positive pressure.

8. The method of claim 1, wherein the second stage comprises a regulable blower for recirculation of the water vapor.

9. The method of claim 8, wherein the regulable blower is regulated to set a desired degree of recirculation.

10. The method of claim 1, wherein the calcination to completion in the reaction vessel takes place under positive-pressure conditions.

11. The method of claim 10, wherein the calcination to completion in the reaction vessel takes place under between 2 and 4.5 bar of positive pressure.

12. The method of claim 1, wherein dwell duration of the gypsum in the second stage is 6 to 40 minutes.

13. The method of claim 12, wherein the dwell duration is 10 to 25 minutes.

14. The method of claim 1, wherein the calcination in the second stage is realized at a temperature of less than 160° C.

15. The method of claim 1, comprising setting of a content of water of crystallization in the transfer line of 8% to 20%.

16. The method of claim 15, wherein a target content of water of crystallization in the second stage is set to a value of 5 to 7%.

17. The method of claim 1, wherein the method is carried out in a continuous manner.

18. The method of claim 1, wherein the calcination in the second stage is realized at a temperature between 120 and 150° C.

19. A calcining installation for calcining gypsum, comprising:
   a calciner in a first stage, the calciner being configured for flash calcination,
   a reaction vessel in a second stage arranged downstream of the first stage with respect to the direction of process flow, the reaction vessel being configured for calcination to completion,
   a transfer line for guiding the gypsum from the first stage to the second stage, and
   a discharge device for removing the gypsum from the second stage,
   wherein the reaction vessel is configured for indirect heating and automatic recirculation of water vapor.

20. The calcining installation of claim 19, wherein the second stage comprises a regulator for variable recirculation in the reaction vessel with differing degree of recirculation.

21. The calcining installation of claim 20, wherein the regulator is configured to set to an excessively high content of water of crystallization in the transfer line that is greater than a target content of water of crystallization of the second stage.

22. The calcining installation of claim 20, wherein the regulator is configured to remove waste gas for modifying water vapor content in the second stage.

23. The calcining installation of claim 19, wherein the reaction vessel is a positive-pressure vessel.

24. A retrofit calcining reactor comprising:
   a connection for connecting a transfer line for supplying gypsum from a flash calciner,
   a retrofit reactor,
   an indirect heater for indirect heating in the retrofit reactor, and
   a recirculator that is configured for automatic recirculation of water vapor.

25. The retrofit calcining reactor of claim 24, wherein the retrofit reactor is a positive-pressure vessel.

26. The retrofit calcining reactor of claim 24, comprising a discharge for discharging the calcined gypsum from the retrofit reactor and a waste-air line for vapor.

27. The retrofit calcining reactor of claim 26, wherein the waste-air line for vapor is connected to the recirculator such that the vapor is directly introduced back into the retrofit reactor.

28. The retrofit calcining reactor of claim 24, wherein the recirculator comprises a regulable blower.

* * * * *